(12) United States Patent
Gonioukh et al.

(10) Patent No.: US 6,458,904 B1
(45) Date of Patent: Oct. 1, 2002

(54) CATALYST FOR THE (CO) POLYMERIZATION OF ALK-1-ENES

(75) Inventors: Andrei Gonioukh, Dudenhofen; Andreas Deckers, Flomborn; Eckard Schauss, Heuchelheim; Roger Klimesch, Hähnlein; Wilhelm Weber, Neustadt, all of (DE)

(73) Assignee: BASELL Polyolefine GmbH, Wesseling (DE)

( * ) Notice: Subject to any disclaimer, the term of this patent is extended or adjusted under 35 U.S.C. 154(b) by 0 days.

(21) Appl. No.: 09/485,767

(22) PCT Filed: Aug. 19, 1998

(86) PCT No.: PCT/EP98/05274
§ 371 (c)(1),
(2), (4) Date: Feb. 17, 2000

(87) PCT Pub. No.: WO99/10388
PCT Pub. Date: Mar. 4, 1999

(30) Foreign Application Priority Data

Aug. 27, 1997 (DE) .......................... 197 37 306

(51) Int. Cl.$^7$ .............................. C08F 4/64; C08F 4/68; C08F 4/642; C08F 4/643
(52) U.S. Cl. ...................... 526/160; 526/127; 526/134; 526/160; 526/943; 502/104; 502/108; 502/117; 502/118
(58) Field of Search ................................. 502/117, 118, 502/108; 526/134, 160, 943, 127, 170

(56) References Cited

U.S. PATENT DOCUMENTS 5,416,179 A * 5/1995 Welch et al. ................ 526/160
6,136,742 A * 10/2000 Chang ......................... 502/108

FOREIGN PATENT DOCUMENTS

| EP | 675 138 | 10/1995 |
| EP | 709 393 | 5/1996 |
| EP | 741146 A1 * | 11/1996 |
| WO | 93/25590 | 12/1993 |

OTHER PUBLICATIONS

Derwent Abst. JP 05320240, May 1992.
J.Chem.Soc. Dalton Trans., 1996, 255–270, Bochmann.

* cited by examiner

*Primary Examiner*—David W. Wu
*Assistant Examiner*—R. Rabago
(74) *Attorney, Agent, or Firm*—Keil & Weinkauf

(57) ABSTRACT

A catalyst composition suitable for the (co)polymerization of alk-1-enes is obtainable by mixing a metallocene complex with a $C_3$–$C_{20}$-alk-1-ene in an inert solvent, reacting the resulting mixture in a controlled manner with a compound capable of forming metallocenium ions and diluting the resulting mixture with an inert nonpolar, essentially aliphatic solvent, and also, if desired, applying the catalyst composition to a particulate support material.

23 Claims, No Drawings

CATALYST FOR THE (CO) POLYMERIZATION OF ALK-1-ENES

The present invention relates to a catalyst composition suitable for the (co)polymerization of alk-1-enes, obtainable by a) mixing a metallocene complex of the formula (I)

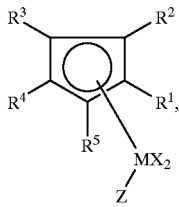
(I)

where the substituents have the following meanings:

M is titanium, zirconium, hafnium, vanadium, niobium or tantalum,

X is hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —$OR^6$ or —$NR^6R^7$, where $R^6$ and $R^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^8)_3$ where $R^8$ is $C_1$–$C_{10}$-alkyl, $C_3$–$C_{10}$-cycloalkyl or $C_6$–$C_{15}$-aryl, Z is X or

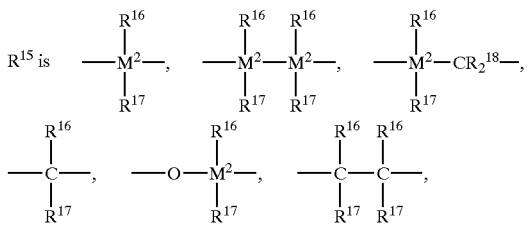

where the radicals $R^9$ to $R^{13}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^{14})_3$ where $R^{14}$ is $C_1$–$C_{10}$-alkyl, $C_6$–$C_{15}$-aryl or $C_3$–$C_{10}$-cycloalkyl, or the radicals $R^4$ and Z together form a —$R^{15}$—A— group, where

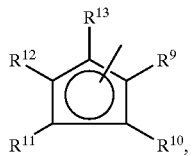

=$BR^{16}$, =$AlR^{16}$, —Ge—, —Sn—, —O—, —S—, =SO, =$SO_2$, =$NR^{16}$, =CO, =$PR^{16}$ or =$P(O)R^{16}$, where $R^{16}$, $R^{17}$ and $R^{18}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or two adjacent radicals together with the atoms connecting them form a ring, and $M^2$ is silicon, germanium or tin, A is —O—, —S—, \NR19 or \PR19, where $R^{19}$ is $C_1$–$C_{10}$-alkyl, $C_6$–$C_{15}$-aryl, $C_3$–$C_{10}$-cycloalkyl, alkylaryl or $Si(R^{20})_3$, $R^{20}$ is hydrogen, $C_1$–$C_{10}$-alkyl, $C_6$–$C_{15}$-aryl which may in turn bear $C_1$–$C_4$-alkyl groups as substituents, or $C_3$–$C_{10}$-cycloalkyl or the radicals $R^4$ and $R^{12}$ together form a —$R^{15}$— group, with a $C_3$–$C_{20}$-alk-1-ene in an inert solvent, where the molar ratio of metallocene complex to alk-1-ene is in the range from 1:0.1 to 1:100, b) reacting the mixture obtained in a) in a controlled manner with a compound (II) capable of forming metallocenium ions and c) diluting the mixture obtained in b) with an inert nonpolar, essentially aliphatic solvent and, if desired, d) applying the catalyst composition obtained in c) to a particulate support material.

Furthermore, the present invention relates to a process for preparing this catalyst composition, a process for preparing alk-1-ene (co)polymers in the presence of this catalyst composition and also the use of this catalyst composition for the polymerization of alk-1-enes.

Cationically activated metallocene catalyst systems for olefin (co)polymerization are sufficiently well known. These systems which are generally derived from a plurality of components can be prepared using a number of different process variants. For example, JP 0 5320240 describes the separate addition of the individual components, viz. alkylated metallocene complex, non-coordinating anion and metal alkyl compound, to the polymerization vessel. If the polymerization-active cationic complex is prepared physically separately from the polymerization system, it is generally necessary to take account of the polarity of the catalyst species when selecting the solvent system to be used. This is because the structure of many metal complexes, but particularly the structure of the activating reagents and also the ion pairs of cationic metallocene complex and anionic non-coordinating counterion formed during the course of the activation, generally make it necessary to employ moderately polar solvents, for example aromatic or halogenated hydrocarbons, for this reaction. Thus, EP-A-709 393 describes the cationic activation of metallocene complexes using substituted fluorophenyl ligands in toluene as solvent. WO-93/25590 likewise describes the cationic activation of metallocene complexes, with preference being given to using aromatic solvents, in particular toluene (see examples), for these reactions. The straight-chain, branched or alicyclic hydrocarbons which are likewise mentioned have generally been found to be unsuitable for this purpose, since they are not able to dissolve, in particular, the cationic metallocene complexes and the activating reagents to a sufficient extent. The document cited describes a binuclear transition metal complex as precursor of the cationically activated catalyst species. Bochmann et al. (J. Chem. Soc., Dalton Trans., 1996, pp. 255–270) were likewise able to detect binuclear systems as intermediates or by-products in cationic metallocene activation. These complexes have only a very low catalyst activity, if any, and make no contribution to increasing the catalyst productivity. In addition, in aliphatic solvents they form an insoluble precipitate which can have a long-term hindering effect in the production process for preparing the polymer.

The cationically activated metallocene complexes can also be advantageously used in unsupported form in slurry or solution polymerization processes. Solvents which have been found to be suitable for these polymerization processes, in particular for polymerization processes at high temperature and high pressure, are, in particular, aliphatic solvents, particularly saturated hydrocarbons. In contrast, aromatic and halogenated hydrocarbons have disadvantages which are presumably attributable to their reactivity and to destruction or blocking of the catalyst by these compounds. As a result, a lower catalyst productivity, a greater need for alkyl compounds to eliminate impurities and an increased proportion of wax-like by-products in the polymers are observed in polymerizations in these solvents.

The unsatisfactory solubility and thus also the low productivity of cationically activated metallocene catalysts in aliphatic solvents has hitherto usually made it necessary to use aromatic solvents in such solution polymerization processes.

It would therefore be desirable to be able to employ cationically activated metallocene catalysts which are readily soluble even in aliphatic solvents and, in particular, are stable under the conditions of high pressure polymerization and give good productivities. Furthermore, it would be desirable to be able to monitor the concentration of reactive catalyst species during the entire polymerization process in order, even in large-scale applications, to achieve uniform product compositions and avoid process malfunctions in the polymerization.

It is an object of the present invention to provide cationically activated metallocene catalyst compositions which are soluble in aliphatic solvents and display good productivities in the (co)polymerization of alk-1-enes.

We have found that this object is achieved by the catalyst composition described at the outset, a process for preparing this catalyst composition, a process for the (co) polymerization of alk-1-enes in the presence of this catalyst composition and also the use of this catalyst composition for the polymerization of alk-1-enes.

Among the metallocene complexes of the formula (I), preference is given to

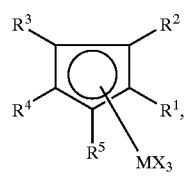
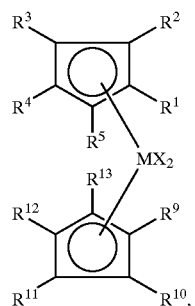
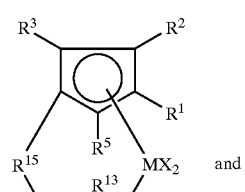
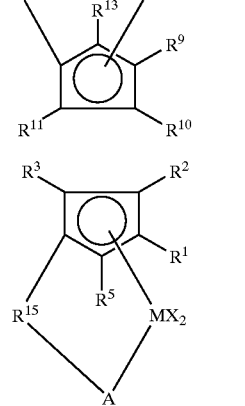

Particular preference is given to transition metal complexes which have two aromatic ring systems bridged to one another as ligands, ie. in particular the transition metal complexes of the formula Ic.

The radicals X can be identical or different; they are preferable identical.

Among the compounds of the formula Ia, particular preference is given to those in which M is titanium, zirconium or hafnium, X is $C_1$–$C_4$-alkyl or phenyl and $R^1$ to $R^5$ are hydrogen or $C_1$–$C_4$-alkyl.

Among the compounds of the formula Ib, preference is given to those in which

M is titanium, zirconium or hafnium,

X is $C_1$–$C_4$-alkyl or phenyl, $R^1$ to $R^5$ are hydrogen, $C_1$–$C_4$-alkyl or $Si(R^8)_3$, $R^9$ to $R^{13}$ are hydrogen, $C_1$–$C_4$-alkyl or $Si(R^{14})_3$.

Compounds of the formula Ib in which the cyclopentadienyl radicals are identical are particularly useful.

Examples of particularly suitable metallocene compounds Ib are, for example, those derived from the following starting compounds:

bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride,
where the selection is preferably made from among the corresponding dimethylzirconium compounds.

Particularly useful compounds of the formula Ic are those in which $R^1$ and $R^9$ are identical and are hydrogen or $C_1$–$C_{10}$-alkyl groups, $R^5$ and $R^{13}$ are identical and are hydrogen, methyl, ethyl, isopropyl or tert-butyl, $R^2$, $R^3$, $R^{10}$ and $R^{11}$ have the meanings: $R^3$ and $R^{11}$ are $C_1$–$C_4$-alkyl, $R^2$ and $R^{10}$ are hydrogen or two adjacent radicals $R^2$ and $R^3$ or $R^{10}$ and $R^{11}$ together form cyclic groups having from 4 to 12 carbon atoms,

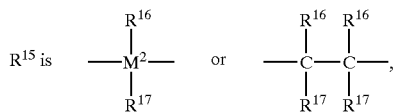

M is titanium, zirconium or hafnium and

X is $C_1$–$C_4$-alkyl or phenyl.

Examples of particularly suitable complexes Ic are, for example, those which are derived from the following starting compounds:

dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluorenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylindenyl)zirconium dichloride,
dimethylsilanediylbis(2-methylbenzindenyl)zirconium dichloride
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl) zirconium dichloride,
diphenylsilanediylbis(2-methylbenzindenyl)zirconium dichloride,
diphenylsilanediylbis(2-ethylbenzindenyl)zirconium dichloride,
and dimethylsilanediylbis(2-methylindenyl)hafnium dichloride, where the selection is preferably made from among the corresponding dimethylzirconium compounds.

Particularly useful compounds of the formula Id are those in which

M is titanium or zirconium,

X is $C_1$–$C_4$-alkyl or phenyl,

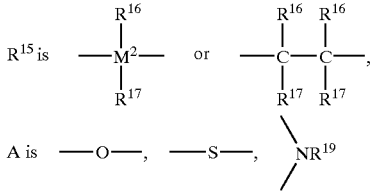

and $R^1$ to $R^3$ and $R^5$ are hydrogen, $C_1$–$C_{10}$-alkyl, $C_3$–$C_{10}$-cycloalkyl, $C_6$–$C_{15}$-aryl or $Si(R^8)_3$, or two adjacent radicals form a cyclic group having from 4 to 12 carbon atoms.

The synthesis of such complexes can be carried out by methods known per se, with preference being given to reacting the appropriately substituted, cyclic hydrocarbon anions with halides of titanium, zirconium, hafnium, vanadium, niobium or tantalum.

Examples of appropriate preparative methods are described, for example, in Journal of Organometallic Chemistry, 369 (1989), 359–370.

It is also possible to use mixtures of various metallocene complexes.

In reaction step a), a wide variety of $C_3$–$C_{20}$-alk-1-enes can be reacted with a metallocene complex (I). Preference is given to those having from 3 to 16 carbon atoms in the chain. These alk-1-enes can be linear or branched. Examples which may be mentioned are 1-butene, 3-methylbut-1-ene, 1-pentene, 3-methylpent-1-ene, 4-methylpent-1-ene, 1-hexene, 1-heptene, 1-octene, 1-decene or 1-dodecene. Particular preference is given to adding butene, hexene or octene in step a). It is also possible to use any mixtures of the alk-1-enes mentioned. The molar ratio of metallocene complex (I) to alk-1-ene in step a) is generally in the range from 1:0.1 to 1:100, preferably in the range from 1:1 to 1:10. Even a small excess of alk-1-ene generally effects a significant increase in the solubility of the cationically activated metallocene complex in aliphatic solvents. Particularly in the case of relatively long-chain alk-1-enes, for instance having from 6 to 12 carbon atoms, an equimolar addition is often sufficient, while use of an excess is advisable in the case of shorter alk-1-enes. After initial addition of the alk-1-ene in reaction step a), small amounts of internal alkenes such as 2-butene, 2-pentene, 2- or 3-hexene a trans or cis isomers, in particular cis isomers, or cyclic alkenes such as cyclohexene can also be mixed in.

The reaction a) of the metallocene complex (I) with an alk-1-ene is usually carried out in an inert solvent. This is usually a moderately polar solvent so that the reaction components can be kept in solution sufficiently well in as small as possible a volume. Step a) is preferably carried out in the presence of an aromatic solvent such as toluene, ethylbenzene or xylene or a halogenated hydrocarbon such as dichloromethane or chloroform, particularly preferably in the presence of toluene or xylene. The use of solvent mixtures is also possible.

The reaction with the alk-1-ene in step a) is generally carried out at from −90 to 150° C., preferably from 30 to 110° C.; the reaction time should be at least 0.1 second.

The alk-1-enes can be used as such or in the form of a solution, preferably dissolved in an inert solvent, eg. as described above for step a). In most cases, it has been found to be practicable to add the alk-1-ene in pure form to the dissolved metallocene complex (I).

Suitable compounds (II) capable of forming metallocenium ions, hereinafter also referred to as activators or activator compounds, in step b) are strong, uncharged Lewis acids, ionic compounds containing Lewis acid cations or ionic compounds containing Brönsted acids as cations.

As strong, uncharged Lewis acids, preference is given to compounds of the formula (III)

$$M^3X^1X^2X^3 \qquad (III)$$

where
M³ is an element of main group III of the Periodic Table, in particular B, Al or Ga, preferably B,
$X^1$, $X^2$ and $X^3$ are hydrogen, $C_1$–$C_{10}$-alkyl, $C_6$–$C_{15}$-aryl, alkylaryl, arylalkyl, each having from 1 to 10 carbon atoms in the alkyl radical and from 6 to 20 carbon atoms in the aryl radical, halo-$C_1$–$C_{10}$-alkyl, halo-$C_6$–$C_{15}$-aryl or fluorine, chlorine, bromine or iodine, in particular haloaryls, preferably pentafluorophenyl.

Particular preference is given to compounds of the formula (III) in which $X^1$, $X^2$ and $X^3$ are identical, preferably tris(pentafluorophenyl)borane.

Suitable ionic compounds containing Lewis acid cations are compounds of the formula (IV)

$$[(G^{a+})Q_1Q_2 \ldots Q_z]^{d+} \qquad (IV)$$

where
G is an element of main groups I to VI or transition groups I to VIII of the Periodic Table,
$Q_1$ to $Q_z$ are singly negatively charged groups such as $C_1$–$C_{28}$-alkyl, $C_6$–$C_{15}$-aryl, alkylaryl, arylalkyl, each having from 6 to 20 carbon atoms in the aryl part and from 1 to 28 carbon atoms in the alkyl part, halo-$C_1$–$C_{28}$-alkyl or halo-$C_6$–$C_{15}$-aryl, $C_3$–$C_{10}$-cycloalkyl which may in turn bear $C_1$–$C_{10}$-alkyl groups as substituents, halogen, $C_1$–$C_{28}$-alkoxy, $C_6$–$C_{15}$-aryloxy, silyl or mercaptyl groups,
a is an integer from 1 to 6,
z is an integer from 0 to 5 and
d is the difference a−z, but d is greater than or equal to 1.

Particularly suitable Lewis acid cations are carbonium cations, oxonium cations and sulfonium cations and also cationic transition metal complexes. Particularly mention may be made of the triphenylmethyl cation, the silver cation and the 1,1'-dimethylferrocenyl cation. They preferably have non-coordinating counterions, in particular boron compounds as are also mentioned in WO 91/09882, preferably tetrakis(pentafluorophenyl)borate.

Ionic compounds containing Brönsted acids as cations and likewise non-coordinating counterions are mentioned in WO 91/09882; the preferred cation is the N,N-dimethylanilinium cation.

Reaction of the mixture from reaction step a) with an activated compound (II) as described in step b) gives a cationically activated metallocene compound which is readily soluble in aliphatic solvents or in solvent systems which have a substantial aliphatic content. The mixture obtained as described in step a) is advantageously added slowly, ie. in a controlled manner, if appropriate dropwise, to the activator compound which is preferably present in the form of a separately prepared suspension or solution. Suitable suspension media are inert aromatic liquids, for example benzene, toluene or xylene.

The reaction in step b) with the compound (II) capable of forming metallocenium ions is generally carried out at from −50 to 150° C., preferably from 30 to 100° C.

After the activation of the metallocene complex in step b), the reaction mixture is diluted with an inert nonpolar, essentially or exclusively aliphatic solvent (step c)). Use is advantageously made of at least 2, particularly preferably at least 5 and in particular at least 10, parts by volume of this solvent, based on the mixture obtained as described in steps a) and b). Suitable aliphatic solvents are pure hydrocarbons and also hydrocarbon mixtures. Examples of suitable hydrocarbons are pentane, hexane, heptane, octane, nonane, decane, dodecane and isododecane; linear or branched isomers or mixtures thereof can be used. Recourse is particularly frequently made to isododecane. For the catalyst composition of the present invention, it is not harmful for the inert nonpolar aliphatic solvent to contain small residual amounts of inert polar, aromatic solvent components such as toluene, ethylbenzene, xylene, dichloromethane or chloroform. The mixing or dilution in step c) can be carried out in combination with the subsequent polymerization reaction, for example by introducing the reaction mixture from step b) into a polymerization vessel and there diluting it appropriately. In this case, the dilution can be carried out before addition of the alk-1-ene to be polymerized, but an alk-1-ene/solvent mixture can also be initially charged, so that the polymerization can be commenced simultaneously with the dilution of the reaction mixture from step b). It is likewise possible, and for practical reasons often advantageous, to carry out the dilution of the reaction mixture from step b) at first only with the above-described amount of an aliphatic solvent. This gives a storage-stable, active catalyst composition which essentially has an aliphatic solvent and can be used in a customary manner at a future point in time for polymerization reactions or for application to a suitable support material. The catalyst compositions of the present invention obtained in step c) are generally in the form of a solution.

In order to make full use of the advantages of the catalyst composition of the present invention, the reaction mixture from step b) is advantageously mixed with at least 10 parts by volume of an aliphatic hydrocarbon until it is used in a later polymerization process. An even greater dilution volume can be advantageous for process reasons. In any case, good results are achieved by dilution with from 10 to 1000, preferably from 10 to 100, parts by volume. In this context, hydrocarbons also include mixtures of various hydrocarbons.

The metallocene compound (I) can be prepared in various ways with which those skilled in the art are familiar. An advantageous synthesis starts from metallocene compounds of the formula (V). It is particularly advantageous for the reaction to produce the metallocene compound (I) to be carried out in situ by reacting a metallocene compound of the formula (V)

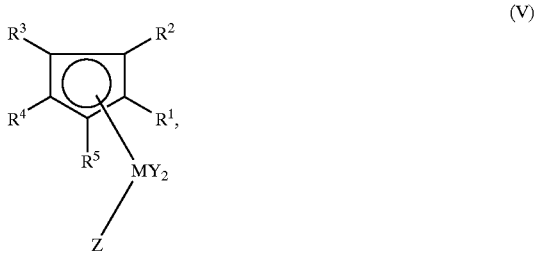

(V)

where $R^1$, $R^2$, $R^3$, $R^4$, $R^5$, M and Z are as defined above and

Y are, independently of one another, fluorine, chlorine, bromine or iodine, with a metal compound of the formula VI

(VI), where $M^4$ is a metal of main group I, II or III of the Periodic Table, ie. boron, aluminum, gallium, indium or thallium, in particular aluminum, $T^1$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical, $T^2$ and $T^3$ are hydrogen, halogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical or alkoxy, o is an integer from 1 to 3 and p and q are integers from 0 to 2, where the sum $o+p+q$ corresponds to the valence of $M^4$.

Preference is given to those compounds (VI) in which $M^4$ is lithium, magnesium or aluminum and $T^1$ to $T^3$ are $C_1$–$C_{10}$-alkyl.

Particularly preferred metal compounds of the formula VI are n-butyllithium, n-butyl-n-octylmagnesium, n-butyl-n-heptylmagnesium, tri-n-hexylaluminum and, in particular, triisobutylaluminum. Among the metal compounds (VI) mentioned, preference is given to using aluminum alkyls.

The conditions for the reaction are not critical per se. Temperatures, reaction times and pressures depend on the time at which the reaction is carried out.

It has been found to be particularly advantageous for the resulting mixture to be directly reacted further, without purification, as described in the steps a) to c) or, if desired, d), ie. the resulting mixture is reacted directly with the alk-1-ene in step a). The metallocene compound (V) is appropriately in the form of a solution in an inert aromatic solvent or a halogenated hydrocarbon. Suitable solvents are, for example, moderately polar liquids as are also used for the above-described reaction step a), ie., for example, toluene or xylene. It is also possible to use solvent mixtures. The metal compound (VI) is likewise generally reacted as a solution in an inert solvent with the metallocene compound (V). For this purpose, use is frequently made of linear or branched aliphatic hydrocarbons such as hexane or heptane.

The catalyst composition of the present invention can be used in all customary polymerization processes for the polymerization or copolymerization of $C_2$–$C_{20}$-alk-1-enes, if desired also together with other vinylic monomers. However, the advantages of the catalyst composition of the present invention are brought to bear particularly well in processes for the polymerization of $C_2$–$C_{20}$-alk-1-enes which are carried out in solution in the presence of a catalyst composition which is in the form of a solution.

For this purpose, suitable solvents are both pure hydrocarbons and hydrocarbon mixtures. Examples which may be mentioned are hexane, heptane, octane, nonane, decane, dodecane and isododecane, with linear or branched isomers as well as their mixtures being able to be used.

The catalyst composition of the present invention can be particularly advantageously employed in solution polymerizations, eg. in autoclave processes, under atmospheric pressure conditions or in high pressure processes. The latter are preferably carried out in tube reactors.

The solution polymerization under atmospheric pressure is preferably carried out at from –100 to 200° C., in particular from 30 to 80° C. The polymerization time is usually in the range from 1 minute to 12 hours; satisfactory results are also achieved using reaction times of less than 20 minutes. The polymerization can be stopped by addition of proton-active compounds such as mineral or organic acids, alcohols or water as well as mixtures of the compounds mentioned. Suitable organic acids are, for example, acetic acid or benzoic acid; suitable alcohols are, for example, methanol, ethanol or i-propanol.

The catalyst productivity in solution polymerization is regularly above 0.80 kg of polymer/g of metallocene complex (I).

Preference is given to processes for polymerizing alk-1-enes in which the polymerization is carried out at from 160 to 350° C. and at pressures from 500 to 3500 bar. Particularly preferred temperatures for these processes are from 180 to 280° C.; particularly preferred pressures are from 1000 to 3000 bar. Further details on carrying out such polymerizations in high pressure reactors are described, for example, in "Ullmann's Encyklopädie der technischen Chemie", Verlag Chemie, Weinheim, Volume 19, (1980), pages 169 to 195.

The catalyst productivities achieved are generally above 155 kg of polymer/g of metallocene complex (I) for homopolymerization and copolymerization. The increased activity of the catalyst compositions of the present invention is also indicated by the temperature rise at the beginning of the tube reactor. A temperature rise of 5° C./m and above can be observed over the initial region of the tube reactor system.

A wide variety of $C_2$–$C_{20}$-alk-1-enes can be polymerized or copolymerized by the polymerization process of the present invention. For the purposes of the present invention, polymerization or copolymerization encompasses homopolymerization of an alk-1-ene, copolymerization of different alk-1-enes or copolymerization of alk-1-enes with other vinylic comonomers such as styrene. The catalyst composition of the present invention is particularly useful in processes for the homopolymerization of $C_2$–$C_6$-alk-1-enes, particularly for the polymerization of ethene or propene, preferably ethene, and for the copolymerization of $C_2$–$C_8$-alk-1-enes. Preference is given to copolymerizing ethene with $C_3$–$C_{20}$-alk-1-enes, in particular $C_3$–$C_8$-alk-1-enes. Ethene is generally incorporated as main component in these copolymers. Both binary and higher copolymer systems can be obtained by means of the process of the present invention.

The catalyst compositions of the present invention can also be used for preparing supported catalyst systems. Suitable support materials are particulate support materials. Examples of organic support materials are polyolefins such as polyethylene, polypropylene, poly-1-butene and polymethyl-1-pentene and copolymers of the monomers on which these polymers are based, also polyesters, polyamides, polyvinyl chloride, polyacrylates and polymethacrylates and polystyrene. However, preference is given to inorganic support materials such as porous oxides, eg. $SiO_2$, $Al_2O_3$, MgO, $ZrO_2$, $TiO_2$, $B_2O_3$, CaO, ZnO. Metal halides such as $MgCl_2$ are also suitable as supports. It is also possible to use any mixtures of the abovementioned inorganic support materials. The support materials preferably have a particle diameter of from 1 to 300 μm, in particular from 30 to 70 μm. Particularly preferred supports are, for example, silica gels, preferably those of the formula $SiO_2$. a $Al_2O_3$, where a is a number in the range from 0 to 2, preferably from 0 to 0.5; these are thus aluminosilicates or silicon dioxide. Such products are commercially available, eg. Silica Gel 332 from Grace.

It has been found to be advantageous to free the aluminosilicates or silicates of physisorbed water at from 140 to 200° C. and a pressure of about 1 mbar before the actual application of the catalyst to the support. This process is also generally known as calcination.

The support material is usually added while stirring to the catalyst composition of the present invention. After a residence time which may be in the range from a few minutes to a number of hours, the liquid phase is advantageously removed under reduced pressure. However, a polymerization-active supported catalyst is also obtained when the liquid phase is removed from the suspension while stirring immediately after addition of the support material. The supported catalyst systems described can be used for the homopolymerization and copolymerization of alk-1-enes.

The use of the catalyst composition of the present invention for the polymerization of alk-1-enes has various advantages: the solubility and miscibility with aliphatic solvents makes it possible to do without relatively large amounts of aromatic or halogenated solvents. As a result, the catalyst complex is more stable and has a longer life. Fewer termination reactions and therefore significantly smaller proportions of wax-like polymers are observed in the polymerizations. The polymers obtained therefore have a particularly good homogeneity. Furthermore, the catalyst compositions of the present invention display better productivities than corresponding catalyst compositions based on toluene. The improved solubility of the catalyst compositions of the present invention also gives particular advantages under the reaction conditions of high pressure polymerization where, particularly when the process is carried out continuously, a reduced fault rate is observed.

The following examples illustrate the advantages of the invention:

EXAMPLES

A. Preparation of the Catalyst Composition of the Present Invention

Example 1

200 mmol of triisobutylaluminum (TIBA) (2 M solution in heptane) were added to a solution of bis(n-butylcyclopentadienyl)zirconium dichloride (hereinafter bis(n-BuCp)$ZrCl_2$) (20 mmol) in 2 l of toluene and the mixture was stirred for 1 hour at room temperature. 1-Octene (1 mol) was added to the above solution and stirring was continued for another 15 minutes (mixture A). N,N-Dimethylanilinium tetrakis(pentafluorophenyl)borate (24 mmol) was separately suspended in 1 l of toluene (mixture B).

The mixture A was then slowly added to mixture B and stirred for 15 minutes. The resulting solution was diluted with 47 l of isododecane. This gave a clear catalyst solution (C-1) which could be used directly for polymerization experiments.

Example 2

200 mmol of triisobutylaluminum (TIBA) (2 M solution in heptane) were added to a solution of bis(n-BuCp)$ZrCl_2$ (20 mmol) in 2 l of toluene and the mixture was stirred for 1 hour at room temperature. 1-Octene (1.5 mol) was added to the above solution and stirring was continued for another 15 minutes (mixture A). N,N-Dimethylanilinium tetrakis(pentafluorophenyl)borate (24 mmol) was separately suspended in 1 l of toluene (mixture B).

The mixture A was then slowly added to mixture B and stirred for 15 minutes. The resulting solution was diluted with 47 l of isododecane. This gave a clear catalyst solution (C-2) which could be used directly for polymerization experiments.

Example 3

200 mmol of triisobutylaluminum (TIBA) (2 M solution in heptane) were added to a solution of bis(n-Bucp)$zrCl_2$ (20 mmol) in 2 l of toluene and the mixture was stirred for 1 hour at room temperature. 1-Octene (2 mol) was added to the above solution and stirring was continued for another 15 minutes (mixture A). N,N-Dimethylanilinium tetrakis(pentafluorophenyl)borate (24 mmol) was separately suspended in 1 l of toluene (mixture B).

The mixture A was then slowly added to mixture B and stirred for 15 minutes. The resulting solution was diluted with 47 l of isododecane. This gave a clear catalyst solution (C-3) which could be used directly for polymerization experiments.

Example 4

200 mmol of triisobutylaluminum (TIBA) (2 M solution in heptane) were added to a solution of bis(n-BuCp)$ZrCl_2$ (20 mmol) in 2 l of toluene and the mixture was stirred for 1 hour at room temperature. 1-Octene (1.5 mol) was added to the above solution and stirring was continued for another 15 minutes (mixture A). N,N-Dimethylanilinium tetrakis(pentafluorophenyl)borate (24 mmol) was separately suspended in 1 l of toluene (mixture B).

The mixture A was then slowly added to mixture B and stirred for 3 hours. The resulting solution was diluted with 47 l of isododecane. This gave a clear catalyst solution (C-4) which could be used directly for polymerization experiments.

Example 5

200 mmol of triisobutylaluminum (TIBA) (2 M solution in heptane) were added to a solution of bis(n-BuCp)$ZrCl_2$ (20 mmol) in 2 l of toluene and the mixture was stirred for 1 hour at room temperature. 1-Octene (20 mmol) was added to the above solution and stirring was continued for another 15 minutes (mixture A). N,N-Dimethylanilinium tetrakis(pentafluorophenyl)borate (24 mmol) was separately suspended in 1 l of toluene (mixture B).

The mixture A was then slowly added to mixture B and stirred for 15 minutes. The resulting solution was diluted with 47 l of isododecane. This gave a clear catalyst solution (C-5) which could be used directly for polymerization experiments.

Example 6

200 mmol of triisobutylaluminum (TIBA) (2 M solution in heptane) were added to a solution of bis(n-BuCp)$ZrCl_2$ (20 mmol) in 2 l of toluene and the mixture was stirred for 1 hour at room temperature. 1-Octene (20 mol) was added to the above solution and stirring was continued for another 15 minutes (mixture A). N,N-Dimethylanilinium tetrakis (pentafluorophenyl)borate (24 mmol) was separately suspended in 1 l of toluene (mixture B).

The mixture A was then slowly added to mixture B and stirred for 15 minutes. The resulting solution was diluted with 47 l of isododecane. This gave a clear catalyst solution (C-6) which could be used directly for polymerization experiments.

B. Preparation of comparative catalyst compositions which are not according to the present invention:

Example N-1

200 mmol of triisobutylaluminum (TIBA) (2 M solution in heptane) were added to a solution of bis(n-BuCp)ZrCl$_2$ (20 mmol) in 2 l of 40 toluene and the mixture was stirred for 1 hour at room temperature.

24 mmol of N,N-dimethylanilinium tetrakis (pentafluorophenyl)borate were then added and the mixture was stirred for 15 minutes at room temperature. The resulting suspension was diluted with 48 l of toluene. The catalyst composition formed (C-N1) was used in the polymerization.

Example N-2

200 mmol of triisobutylaluminum (TIBA) (2 M solution in heptane) were added to a solution of bis(n-BuCp)ZrCl$_2$ (20 mmol) in 2 l of toluene and the mixture was stirred for 1 hour at room temperature.

24 mmol of N,N-dimethylanilinium tetrakis (pentafluorophenyl)borate were then added and the mixture was stirred for 3 hours at room temperature. The resulting solution was diluted with 48 l of toluene. The catalyst composition formed (C-N2) was used in the polymerization.

Example N-3

200 mmol of triisobutylaluminum (TIBA) (2 M solution in heptane) were added to a solution of bis(n-BuCp)ZrCl$_2$ (20 mmol) in 2 l of toluene and the mixture was stirred for 1 hour at room temperature.

24 mmol of N,N-dimethylanilinium tetrakis (pentafluorophenyl)borate were then added and the mixture was stirred for 3 hours at room temperature. The resulting solution was diluted with 48 l of isodecane, the precipitate formed was separated off by decantation and the resulting solution (C-N3) was used in the polymerization.

Example N-4

200 mmol of triisobutylaluminum (TIBA) (2 M solution in heptane) were added to a solution of bis(n-BuCp)ZrCl$_2$ (20 mmol) in 2 l of toluene and the mixture was stirred for 1 hour at room temperature.

24 mmol of N,N-dimethylanilinium tetrakis (pentafluorophenyl)borate were then added and the mixture was stirred for 15 minutes at room temperature. 40 mmol of 1-octene were added to this solution and stirring was continued for another 15 minutes. The resulting solution was diluted with 2 l of isododecane, the precipitate formed was separated off by decantation and supernatant liquid was diluted with 46 l of isododecane. The resulting catalyst composition (C-N4) was used in the polymerization.

Example N-5

200 mmol of triisobutylaluminum (TIBA) (2 M solution in heptane) were added to a solution of bis(n-BuCp)ZrCl$_2$ (20 mmol) in 2 l of toluene and the mixture was stirred for 1 hour at room temperature.

24 mmol of N,N-dimethylanilinium tetrakis (pentafluorophenyl)borate were then added and the mixture was stirred for 3 hours at room temperature. 40 mmol of 1-octene were added to this solution and stirring was continued for another 15 minutes. The resulting solution was diluted with 2 l of isododecane, the precipitate formed was separated off by decantation and supernatant liquid was diluted with 46 l of isododecane. The resulting catalyst composition (C-N5) was used in the polymerization.

Example N-6

200 mmol of triisobutylaluminum (TIBA) (2 M solution in heptane) were added to a solution of bis(n-BuCp)ZrCl$_2$ (20 mmol) in 2 l of isododecane and the mixture was stirred for 1 hour at room temperature.

24 mmol of N,N-dimethylanilinium tetrakis (pentafluorophenyl)borate were then added and the mixture was stirred for 3 hours at room temperature. 40 mmol of 1-octene were added to this mixture and stirring was continued for another 15 minutes. The resulting solution was diluted with 2 l of isododecane, the precipitate formed was separated off by decantation and supernatant liquid was diluted with 46 l of isododecane. The resulting catalyst composition (C-N6) was used in the polymerization.

Example N-7

200 mmol of triisobutylaluminum (TIBA) (2 M solution in heptane) were added to a solution of bis(n-BuCp)ZrCl$_2$ (20 mmol) in 2 l of toluene and the mixture was stirred for 1 hour at room temperature.

24 mmol of N,N-dimethylanilinium tetrakis (pentafluorophenyl)borate were then added and the mixture was stirred for 3 hours at room temperature. 40 mmol of 1-octene were added to this mixture and stirring was continued for another 15 minutes. The resulting mixture was diluted with 2 l of 1-octene, the precipitate formed was separated off by decantation and supernatant liquid was diluted with 46 l of 1-octene. The solution was unstable. A precipitate formed after only a short time (for analysis of the precipitate, see table, Ex. N-17).

Example N-8

200 mmol of triisobutylaluminum (TIBA) (2 M solution in heptane) were added to a solution of bis(n-BuCp)ZrCl$_2$ (20 mmol) in 2 l of 1-octene and the mixture was stirred for 1 hour at room temperature.

24 mmol of N,N-dimethylanilinium tetrakis (pentafluorophenyl)borate were then added and the mixture was stirred for 3 hours at room temperature. The mixture was diluted with 48 l of 1-octene. The resulting catalyst composition (C-N8) was used in the polymerization.

C. Polymerization experiments
General Experimental Conditions
Solution Polymerization (Batchwise)

The catalyst composition comprising 2.5 mmol of catalyst complex was added to anhydrous toluene (120 ml) and ethylene was passed under atmospheric pressure through the reaction medium at a throughput of 40 l/h. The solution was thermostated at 50° C. The polymerization was stopped by addition of a hydrochloric acid/methanol mixture, the polymer formed was filtered off, washed with toluene and methanol and dried for 6 hours at 90° C. Polymerization results and conditions are summarized in the table below.

Polymerization in a High-pressure Tube Reactor (Continuous)

Polymerizations were carried out at 210 or 230° C. and 1700 bar in a high-pressure tube reactor having an L/D ratio of 1333. The catalyst composition was metered in at the beginning of the reactor in a concentration of $7.59 \times 10^{-2}$ mmol (comparative experiments not according to the present invention) or $6.1 \times 10^{-2}$ Mmol (experiments according to the present invention) of catalyst complex/mol of alk-1-ene. In Examples 7 to 14, only ethylene was fed in; in Example 15, 1-hexene was metered in as comonomer in a molar comonomer ratio ethylene/hexene of 56. In Example 14, hydrogen was used as regulator.

where
R$^6$ and R$^7$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical, $R^1$ to $R^5$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or Si(R$^8$)$_3$ where R$^8$ is $C_1$–$C_{10}$-alkyl, $C_3$–$C_{10}$-cycloalkyl or $C_6$–$C_{15}$-aryl,

TABLE

Results of the polymerization experiments

| Ex. | Catalyst | Method[a] | Temperature [° C.] | Time [min] | Catalyst productivity kg of polymer/ g of metallocene (I) | MFI (190° C./2.16 kg) [g/10 min] | $M_w/M_n$ | T gradient[b] [° C./m] |
|---|---|---|---|---|---|---|---|---|
| N-9 | C-N1 | B, C | | | 0 | — | — | — |
| N-10 | C-N2 | B | 50 | 45 | 0.70 | 3.4 | — | — |
| N-11 | C-N2 | C | 210 | | 73.50 | 43.0 | 2.6 | 1.4 |
| N-12 | C-N3 | B, C | | | 0 | — | — | — |
| N-13 | C-N4 | B, C | | | 0 | — | — | — |
| N-14 | C-N5 | B | 50 | 45 | 0.78 | 2.9 | — | — |
| N-15 | C-N5 | C | 210 | | 153.00 | 15.0 | 2.2 | 3.2 |
| N-16 | C-N6 | B, C | | | 0 | — | — | — |
| N-17 | C-N7 | | | | 2.34[c] | | | 3.62 |
| N-18 | C-N8 | B | 50 | 45 | 0 | — | — | — |
| E-7 | C-1 | B | 50 | 15 | 0.82 | | | |
| E-8 | C-2 | B | 50 | 15 | 1.02 | | | |
| E-9 | C-3 | B | 50 | 15 | 0.97 | | | |
| E-10 | C-4 | B | 50 | 15 | 0.99 | | | |
| E-11 | C-5 | B | 50 | 15 | very low | | | |
| E-12 | C-6 | B | 50 | 15 | very low | | | |
| E-13 | C-2 | C | 230 | | 167.5 | 10.0 | 2.0 | 8.5 |
| E-14 | C-2 | C | 230 | | 180.1 | 300[d] | 2.6 | 9.0 |
| E-15 | C-2 | C | 230 | | 155.2 | 18.0 | 2.2 | 7.7 |

[a]B — Batchwise C — Continuous
[b]Temperature rise at the beginning of the high-pressure tube reactor T gradient = $(T_{1=10} - T_{1=0})/10$; [° C./m]
[c]Rubber-like, amorphous polymer
[d]Viscosity in cst (determined in accordance with DIN 51562 at 140° C.)

We claim:

1. A process for preparing a catalyst composition suitable for the (co)polymerization of alk-1-enes, consisting essentially of:

a) mixing a metallocene complex of the formula (I)

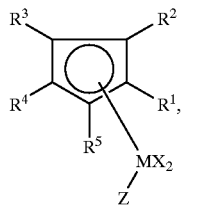

(I)

where the substituents have the following meanings:
M is titanium, zirconium, hafnium, vanadium, niobium or tantalum,
X is hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, —OR$^6$ or —NR$^6$R$^7$, Z is X or

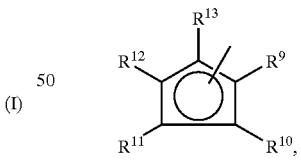

where the radicals
R$^9$ to R$^{13}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or Si(R$^{14}$)$_3$ where
R$^{14}$ is $C_1$–$C_{10}$-alkyl, $C_6$–$C_{15}$-aryl or $C_3$–$C_{10}$-cycloalkyl, or the radicals R$^4$ and Z together form a —R$^{15}$—A— group, where

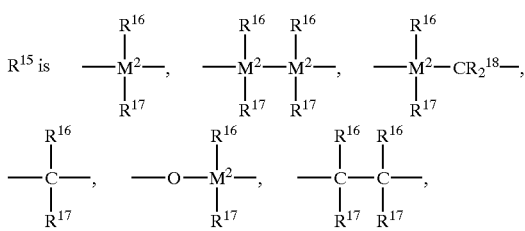

=BR$^{16}$, =AlR$^{16}$, —Ge—, —Sn—, —O—, —S—, =SO, =SO$_2$, =NR$^{16}$, =CO, =PR$^{16}$ or =P(O)R$^{16}$, where R$^{16}$, R$^{17}$ and R$^{18}$ are identical or different and are each a hydrogen atom, a halogen atom, a C$_1$–C$_{10}$-alkyl group, a C$_1$–C$_{10}$-fluoroalkyl group, a C$_6$–C$_{10}$-fluoroaryl group, a C$_6$–C$_{10}$-aryl group, a C$_1$–C$_{10}$-alkoxy group, a C$_2$–C$_{10}$-alkenyl group, a C$_7$–C$_{40}$-arylalkyl group, a C$_8$–C$_{40}$-arylalkenyl group or a C$_7$–C$_{40}$-alkylaryl group, or two adjacent radicals together with the atoms connecting them form a ring, and M$^2$ is silicon, germanium or tin,

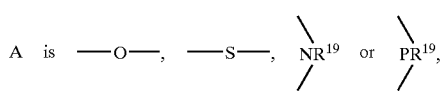

R$^{19}$ is C$_1$–C$_{10}$-alkyl, C$_6$–C$_{15}$-aryl, C$_3$–C$_{10}$-cycloalkyl, alkylaryl or Si(R$^{20}$)$_3$, R$^{20}$ is hydrogen, C$_1$–C$_{10}$-alkyl, C$_6$–C$_{15}$-aryl which may in turn bear C$_1$–C$_4$-alkyl groups as substituents, or C$_3$–C$_{10}$-cycloalkyl or the radicals R$^4$ and R$^{12}$ together form a —R$^{15}$— group, with a C$_3$–C$_{20}$-alk-1-ene in an inert solvent, where the molar ratio of metallocene complex to alk-1-ene is in the range from 1:0.1 to 1:100, b) reacting the mixture obtained in a) with a compound (II) capable of forming metallocenium ions, said compound (II) being 1) a strong uncharged Lewis acid of the formula III $$M^3X^1X^2X^3 \quad (III)$$

where

M$^3$ is an element of main group III of the Periodic Table,

X$^1$, X$^2$ and X$^3$ are hydrogen, C$_1$–C$_{10}$-alkyl, C$_6$–C$_{15}$-aryl, alkylaryl, arylalkyl, each having from 1 to 10 carbon atoms in the alkyl radical and from 6 to 20 carbon atoms in the aryl radical, halo-C$_1$–C$_{10}$-alkyl, halo-C$_6$–C$_{15}$-aryl or fluorine, chlorine, bromine or iodine, 2) an ionic compound containing Lewis acid cations or 3) an ionic compound containing Brönsted acids as cation, and c) diluting the mixture obtained in b) with an inert nonpolar, essentially aliphatic solvent and, optionally, d) applying the catalyst composition obtained in c) to a particulate support material and, optionally, removing the liquid phase from the solution.

2. A process for preparing (co)polymers of C$_2$–C$_{20}$-alk-1-enes, wherein the (co)polymerization is carried out in the presence of the catalyst composition obtained by the process of claim 1.

3. The process of claim 2, wherein the (co)polymerization is carried out in solution.

4. The process of claim 1, wherein aromatic or halogenated hydrocarbons are used as inert solvent in step a).

5. The process of claim 1, wherein the mixture obtained in a) is slowly added to a solution or suspension of the compound (II) capable of forming metallocenium ions.

6. The process of claim 1, wherein the metallocene compound (I) is produced in situ by reacting a metallocene compound of the formula (V)

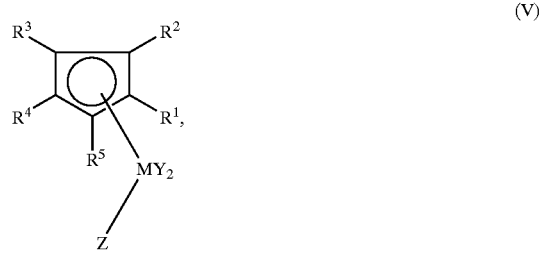

where the substituents have the following meanings:

M is titanium, zirconium, hafnium, vanadium, niobium or tantalum,

R$^1$ to R$^5$ are hydrogen, C$_1$–C$_{10}$-alkyl, 5- to 7-membered cycloalkyl which may in turn bear a C$_1$–C$_{10}$-alkyl group as substituent, C$_6$–C$_{15}$-aryl or arylalkyl, where two adjacent radicals may also together form a saturated or unsaturated cyclic group having from 4 to 15 carbon atoms, or Si(R$^8$)$_3$ where R$^8$ is C$_1$–C$_{10}$-alkyl, C$_3$–C$_{10}$-cycloalkyl or C$_6$–C$_{15}$-aryl, Z is X or

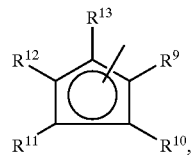

where the radicals

R$^9$ to R$^{13}$ are hydrogen, C$_1$–C$_{10}$-alkyl, 5- to 7-membered cycloalkyl which may in turn bear a C$_1$–C$_{10}$-alkyl as substituent, C$_6$–C$_{15}$-aryl or arylalkyl, where two adjacent radicals may also together form a saturated or unsaturated cyclic group having from 4 to 15 carbon atoms, or Si(R$^{14}$)$_3$ where R$^{14}$ is C$_1$–C$_{10}$-alkyl, C$_6$–C$_{15}$-aryl or C$_3$–C$_{10}$-cycloalkyl, or the radicals R$^4$ and Z together form a —R$^{15}$—A— group, where

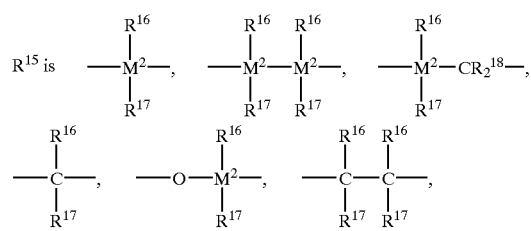

=BR$^{16}$, =AlR$^{16}$, —Ge—, —Sn—, —O—, —S—, =SO, =SO$_2$, =NR$^{16}$, =CO, =PR$^{16}$ or =P(O)R$^{16}$, where R$^{16}$, R$^{17}$ and R$^{18}$ are identical or different and are each a hydrogen atom, a halogen atom, a C$_1$–C$_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a ring, and $M^2$ is silicon, germanium or tin,

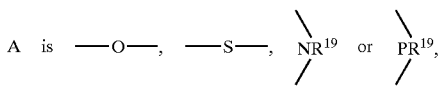

$R^{19}$ is $C_1$–$C_{10}$-alkyl, $C_6$–$C_{15}$-aryl, $C_3$–$C_{10}$-cycloalkyl, alkylaryl or $Si(R^{20})_3$, $R^{20}$ is hydrogen, $C_1$–$C_{10}$-alkyl, $C_6$–$C_{15}$-Aryl which may in turn bear $C_1$–$C_4$-alkyl groups as substituents or $C_3$–$C_{10}$-cycloalkyl or the radicals $R^4$ and $R^{12}$ together form a —$R^{15}$— group, and Y is fluorine, chlorine, bromine or iodine with a metal compound of the formula VI

 (VI), where $M^4$ is a metal of main group I, II or III of the Periodic Table, $T^1$ is hydrogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical, $T^2$ and $T^3$ are hydrogen, halogen, $C_1$–$C_{10}$-alkyl, $C_6$–$C_{15}$-aryl, alkylaryl or arylalkyl each having from 1 to 10 carbon atoms in the alkyl radical and from 6 to 20 carbon atoms in the aryl radical or alkoxy, o is an integer from 1 to 3 and p and q are integers from 0 to 2, where the sum o+p+q corresponds to the valence of $M^4$, and the mixture obtained is, without purification, reacted further as described in the steps a) to c) and, optionally, d).

7. The process of claim 1, wherein the compound (II) capable of forming metallocenium ions is tetrakispentafluorophenylborate.

8. The process of claim 1, wherein $M^3$ is boron.

9. The process of claim 1, wherein the catalyst composition obtained in c) is applied to a particulate support material.

10. The process of claim 9, wherein the liquid phase in d) is removed from the solution.

11. The process of claim 6, wherein a), b) and c) are conducted without purification steps.

12. The catalyst obtained by the process of claim 1.

13. The catalyst obtained by the process of claim 4.

14. The catalyst obtained by the process of claim 5.

15. The catalyst obtained by the process of claim 6.

16. The catalyst obtained by the process of claim 7.

17. The catalyst obtained by the process of claim 8.

18. The catalyst obtained by the process of claim 9.

19. The catalyst obtained by the process of claim 10.

20. The process of claim 1, wherein c) is an essentially aliphatic solution of the catalyst composition.

21. The catalyst obtained the process of claim 20.

22. The process of claim 1, wherein the alk-1-ene is 1-octene.

23. The catalyst obtained by the process of claim 22.

* * * * *